Feb. 6, 1945. E. J. SABOL Re. 22,599

RAIL BOND AND METHOD OF MAKING THE SAME

Original Filed Nov. 8, 1939

Inventor:
ERNEST J. SABOL,
by: John E. Jackson
his Attorney.

Reissued Feb. 6, 1945

Re. 22,599

UNITED STATES PATENT OFFICE 22,599

RAIL BOND AND METHOD OF MAKING THE SAME

Ernest J. Sabol, Norfolk, Va., assignor to The American Steel and Wire Company of New Jersey, a corporation of New Jersey Original No. 2,333,046, dated October 26, 1943, Serial No. 303,485, November 8, 1939. Application for reissue April 25, 1944, Serial No. 532,691

6 Claims. (Cl. 16—108)

This invention is concerned with rail bonds having the conductor strands mechanically joined to the terminals, the primary object being to provide joints of high electrical conductivity and strength between the conductor strands and terminals in a manner permitting quantity production of the bonds.

Specific examples of the invention are illustrated by the accompanying drawing in which.

Figure 1:
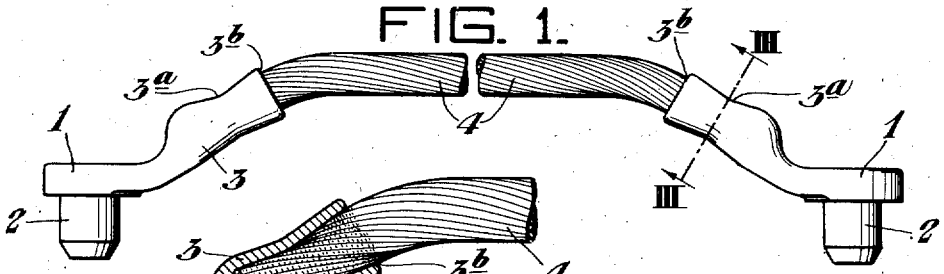
Figure 1 is a side view of an electric power bond of the type wherein the conductor strand spans the outside of the rail joint splice bar.
Figure 2:
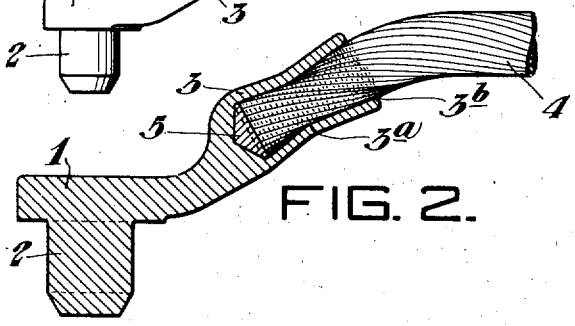
Figure 2 is an enlargement from Figure 1 showing the joint in section.
Figure 3:
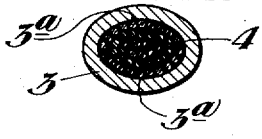
Figure 3 is a cross section taken from the line III—III of Figure 1.

More specifically the bond illustrated by Figures 1 through 3 comprises a terminal having a head 1, a solid stud 2 and a tubular shank 3, the end of the conductor strand 4 being inserted in the tubular shank 3 and the latter being cold compressed so as to form a joint between the terminal and conductor strand.

The terminal is a solid integral forging of pure electrolytic copper, the shank 3 being rendered tubular by drilling which normally leaves a smooth cylindrical inside. The conductor strand 4 is made of intertwisted cold drawn copper wires.

It follows from the above that when the end of the conductor strand is inserted in the inside of the tubular shank, the interengaging surfaces are smooth, the inside of the shank being smoothly drilled and the outer surfaces of the outer wires of the conductor strand being cold drawn to the usual smooth finish. Consequently, compression of the tubular shank 3 onto the end of the conductor strand 4 cannot produce a joint having a tensile strength equaling the tensile strength of the conductor strand. This lack of strength results both from the ability of the outer wires of the strand to slide relative the inside of the shank, and from the tendency of the inner wires of the strand to slide relative the outer wires of the strand. Furthermore, the inside of the tubular shank and the outside of the end of the conductor strand become coated with oxide, grease and other contamination, prior to insertion of the strand into the shank in the quantity production of bonds, and it follows that when the joint is ultimately made it does not possess as high electrical conductivity as is desirable.

Figure 4:
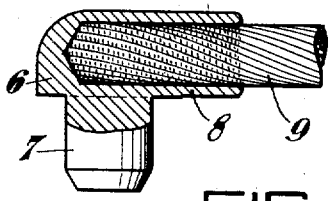
Figure 4 is a longitudinal section showing a partially completed joint between the terminal and conductor strand as applied to a bond of the type wherein the conductor strand passes between the rail bond splice bar and the rail web.
Figure 6:
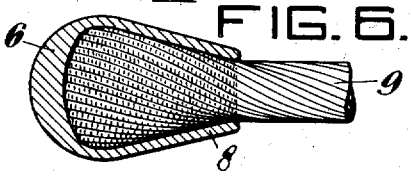
Figures 6, 7 and 8 are sections taken from the lines VI—VI, VII—VII and VIII—VIII, respectively, in Figure 5.
Figure 8:
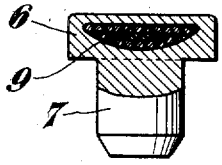
Figure 7:
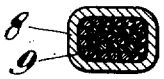

The foregoing discussion is likewise applicable to the manufacture of bonds of the type shown by Figures 4 through 8. The terminal of this bond has a head 6, a stud 7 and a tubular shank 8 in which the end of the conductor strand 9 is inserted. Since this bond must be made with a shorter shank 8 to permit its use in its intended manner, a hole is drilled through the originally solid shank and into the head 6, the latter initially being sufficiently large to accommodate the drilling of a hole of the diameter of the conductor strand, as shown by Figure 4. After the end of the strand is inserted, the head of the bond is cold compressed so as to flatten it and the conductor strand to the form shown by Figures 5 through 8, the tubular shank being flattened into a rectangular form along with the portion of the strand inside it, this resulting in a shape such as shown by Figure 7, while the head and conductor are greatly fanned out, as shown by Figures 6 and 8.

The terminals of electric power bonds of the two types illustrated, in each instance, are forged from pure electrolytic copper. Although the shank, which is originally solid, can be drilled satisfactorily in the quantity production of the bonds, it is impossible to satisfactorily apply machining operations to roughen the inside of the smoothly drilled hole into which the conductor strand end is inserted. This is because pure electrolytic copper is a material which cannot satisfactorily be machined at high speeds. In addition, it is impossible in the quantity production of bonds to machine the outer surfaces of the outer wires of the conductor strand, this following from the inherent nature of stranded assemblies.

According to the present invention, the smooth inside of the tubular shank of the terminal and the smooth outer surfaces of the outer wires of the conductor strand are abraded to roughness by a suitable abrasive means. In the actual commercial production of bonds the abrasive means constitutes wire brushes.

Figure 9:
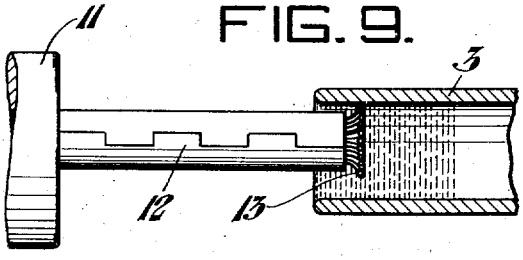
Figures 9 and 10 show the preparation of the terminal and conductor strand end, respectively, to condition them for joining.
Figure 5:
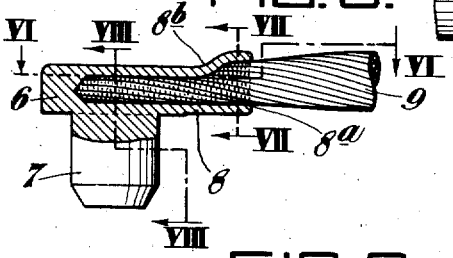
Figure 5 is the same as Figure 4 excepting that the joint is completed.
Figure 10:
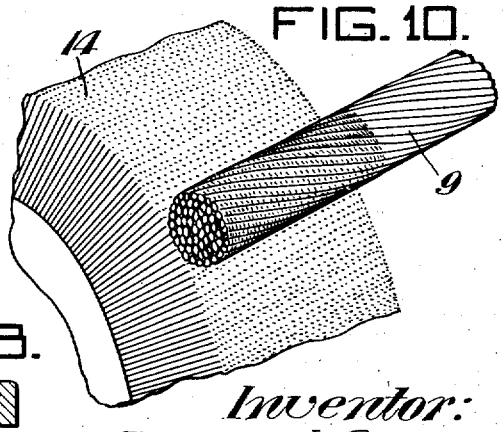

In the drawing, Figure 9 shows a rotary chuck 11 turning a sleeve 12 clamped about a length of wire rope having its ends flared as at 13 to provide a stiff rotary brush. The sleeve 12 is positioned slightly off center so as to cause the rotary brush to wobble. The tubular shank 3 of the terminal of the bond shown by Figures 1 and 2 is shown as being manually worked over this brush 13 while being turned so as to thoroughly abrade its inside to a slight degree of roughness. Quantity production of rail bonds has been practiced by this procedure. Figure 10 of the drawing shows the end of the conductor strand 4 being abraded to roughness by a rotary wire brush 14 of the type used for cleaning purposes in machine shops. Here again, the part is held manually and turned during the abrading operation. Substantially the same procedure is followed in the manufacture of the bond of the type shown by Figure 4.

As shown by the drawing, the result of the above described abrading is to provide the interengaging surfaces of the inside of the shank of the terminal and the outsides of the outer wires of the conductor, with circumferential grooves abraded into these surfaces. This results from the turning of the surfaces circumferentially respecting the rotary wire brushes in the manner described. These abraded surfaces eliminate the necessity for using interposed material in the nature of hard granules or the like, this expedient being suggested in the case of prior art attempts to effect a high-strength joint but being objectionable in that the joint then does not have high electrical conductivity. This follows from the fact that the conductivity of such granules cannot possibly approach that of the electrolytic copper shank.

The above described brushing, in addition to slightly roughening the interengaging surfaces of the terminal shank and conductor strand, also thoroughly cleanse them of the oxide, grease, etc., with which these interengaging surfaces become contaminated when the parts are handled as they must be in the quantity production of rail bonds. Immediately after the brushing operation, the joint is assembled, there being no time for the formation of further oxide or chance for the parts becoming dirty.

Anchorage of the inner wires of the conductor strand respecting the outer wires may be effected by joining the ends of all of the wires of the conductor to a common mass of molten metal which, when solidified, causes the end of the conductor strand to be a unit in so far as its various wires are concerned. This may be done either by welding a steel button to the ends of all the wires, by brazing or by fusing the wire ends together. In any event, the idea is to join the ends of all the wires by means of a common mass of metal. In Figure 2 this mass of metal is shown at 5.

These steps having been performed, the end of the conductor strand is inserted in the tubular shank and the latter cold compressed. Usually this is done in such a manner as to maintain the cylindrical shape of the shank and of the strand within. However, according to the present invention the shank is compressed from its mouth, from which the conductor strand extends, from its uncompressed diameter to gradually progressing smaller diameters to a point spaced from its mouth where it is compressed to a diameter compressing the conductor strand within to a diameter appreciably smaller than the uncompressed diameter of the conductor strand, the shank being then compressed to effect gradually increasing sizes from this point in a direction toward the end of the conductor strand. Preferably, this compression is effected by two dies having suitable contours for effecting the varying degrees of compression when brought together.

In Figure 2, the mouth of the conductor is shown at $3^b$ and the point of maximum compression is shown at $3^a$, the increase in diameter beyond the point $3^a$ providing a socket in which the end of the conductor strand works as a wedge. In Figures 5 through 8 the mouth of the shank is indicated at $8^a$ and the point of smallest diameter at $8^b$, it being noted that in this instance the fanned portion of the strand from the point $8^b$ to the extreme end of the strand is the portion providing the wedge effect. Since this extreme flattening of the strand 9 fixes all or most of the wires against movement, the ends of the wires need not necessarily be joined, no mass of metal being shown because of this.

In the case of either bond the mouth $3^b$ or $8^a$ does not compress the conductor strand to any great degree, compression being gradually applied from the mouth to the point of smallest diameter. The contour of the inside of the shank, in each instance, is smoothly curving with no sharp bends, particularly between the point of smallest diameter and the mouth of the shank. Because of this construction, vibration between the terminal and strand cannot cause the concentration of vibratory stresses which results when the shank is compressed cylindrically, the stresses being gradually transmitted between the interengaging surfaces and terminal shank.

I claim:

1. A method of making a joint of high electrical conductivity and strength between a tubular part made of electrolytic copper and a conductor made of intertwisted copper wires including working the inside of the part with a wire brush to remove all contamination and roughen it, working the outer surfaces of the outer wires of the conductor to remove all contamination and roughen these surfaces, inserting the conductor in the part so the abraded surfaces of the conductor and of the part directly intercontact and are free from interposed material, and cold compressing the part onto the conductor, said method including interconnecting the ends of all of the wires of the conductor with molten metal prior to insertion of the conductor in the part.

2. A method of making a joint of high electrical conductivity and strength between a tubular part made of electrolytic copper and a conductor made of intertwisted copper wires, including working the inside of the part with a wire brush to remove all contamination and roughen it, working the outer surfaces of the outer wires of the conductor to remove all contamination and roughen these surfaces, inserting the conductor in the part so the abraded surfaces of the conductor and of the part directly intercontact and are free from interposed material, and cold compressing the part onto the conductor, said method including interconnecting the ends of all of the wires of the conductor with molten metal prior to insertion of the conductor in the part and compressing the part from its mouth from which the conductor extends from its uncompressed diameter to gradually progressing smaller diameters to a point spaced from its mouth where it is compressed to a diameter compressing the conductor to a diameter appreciably smaller than the uncompressed diameter of the conductor.

3. A joint of high electrical conductivity and strength, comprising a tubular part made of electrolytic copper cold compressed onto a conductor made of stranded copper wires, the interengaging surfaces of the inside of the part and of the outer wires of the conductor being abraded to roughness and free from interposed material, the ends of all the wires of the conductor being interconnected by a solid metal mass preventing slippage of the inner wires and the part being compressed from its mouth from which the conductor extends from its uncompressed diameter to gradually progressing smaller diameters to a point spaced from its mouth where it is compressed to a diameter compressing the conductor to a diameter appreciably smaller than the uncompressed diameter of the conductor.

4. A method of making a joint of high electrical conductivity and strength between a tubular part made of electrolytic copper and a conductor made of stranded copper wires, the method comprising abrading circumferential grooves into the surfaces of the inside of the part and the outsides of the outer wires of the conductor by contacting these surfaces with a rotary wire brush while turning the surface circumferentially respecting the brush, inserting the conductor inside the tubular part so that the abraded surfaces of the conductor and of the part directly intercontact and cold compressing the part onto the conductor to complete the joint.

5. A method of making a joint of high electrical conductivity and strength between a tubular part made of electrolytic copper and a conductor made of stranded copper wires, the method comprising interjoining the ends of all the wires of said conductor by a common mass of fused metal, abrading circumferential grooves into the surfaces of the inside of the part and the outsides of the outer wires of the conductor by contacting these surfaces with a rotary wire brush while turning the surface circumferentially respecting the brush, inserting the conductor inside the tubular part so that the abraded surfaces of the conductor and of the part directly intercontact and cold compressing the part onto the conductor to complete the joint.

6. A joint of high electrical conductivity and strength, comprising a tubular part made of electrolytic copper cold compressed onto a conductor made of stranded copper wires, the interengaging surfaces of the inside of the part and of the outer wires of the conductor being abraded to roughness and free from interposed material, and the part being compressed from its mouth from which the conductor extends from its uncompressed diameter to gradually progressing smaller diameters to a point spaced from its mouth where it is compressed to a diameter compressing the conductor to a diameter appreciably smaller than the uncompressed diameter of the conductor.

ERNEST J. SABOL.